United States Patent
Jutz

(10) Patent No.: US 7,231,653 B2
(45) Date of Patent: Jun. 12, 2007

(54) METHOD FOR DELIVERING TRANSPORT STREAM DATA

(75) Inventor: Curtis E. Jutz, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 1095 days.

(21) Appl. No.: 09/962,286

(22) Filed: Sep. 24, 2001

(65) Prior Publication Data

US 2003/0058933 A1    Mar. 27, 2003

(51) Int. Cl.
*H04N 7/173* (2006.01)
(52) U.S. Cl. ............................ 725/98; 725/93; 725/95; 725/118; 725/132; 370/468
(58) Field of Classification Search ................ 725/93, 725/95, 126, 132, 98, 116, 118, 131; 709/222, 709/237; 370/468, 528; 375/240.01
See application file for complete search history.

(56) References Cited

U.S. PATENT DOCUMENTS

| | | | |
|---|---|---|---|
| 4,602,279 A | 7/1986 | Freeman | |
| 5,075,771 A | 12/1991 | Hashimoto | |
| 5,155,591 A | 10/1992 | Wachob | |
| 5,410,344 A | 4/1995 | Graves et al. | |
| 5,444,499 A | 8/1995 | Saitoh | |
| 5,446,919 A | 8/1995 | Wilkins | |
| 5,483,278 A | 1/1996 | Strubbe et al. | |
| 5,534,911 A | 7/1996 | Levitan | |
| 5,559,549 A | 9/1996 | Hendricks et al. | |
| 5,564,088 A | 10/1996 | Saitoh | |
| 5,585,838 A | 12/1996 | Lawler et al. | |
| 5,600,364 A | 2/1997 | Hendricks et al. | |
| 5,664,091 A | 9/1997 | Keen | |
| 5,686,954 A | 11/1997 | Yoshinobu et al. | |
| 5,724,345 A | 3/1998 | Guarneri et al. | |
| 5,727,002 A | 3/1998 | Miller et al. | |
| 5,751,282 A | 5/1998 | Girard et al. | |
| 5,768,681 A | 6/1998 | Dan et al. | |
| 5,778,182 A | 7/1998 | Cathey et al. | |
| 5,790,935 A | 8/1998 | Payton | |
| 5,801,753 A | 9/1998 | Eyer et al. | |
| 5,838,678 A * | 11/1998 | Davis et al. ................. | 370/389 |

(Continued)

FOREIGN PATENT DOCUMENTS

EP    0 902 569    3/1999

(Continued)

OTHER PUBLICATIONS

Ren-Hung Hwang, et al., "Scheduling Policies for an VOD System over CATV Networks", Department of Computer Science & Information Engineering © 1997. pp. 438-442.

(Continued)

*Primary Examiner*—Kieu-Oanh Bui
(74) *Attorney, Agent, or Firm*—Blakely, Sokoloff, Taylor & Zafman LLP

(57) ABSTRACT

According to one embodiment, a system is disclosed. The system includes a transmission device that converts a transport stream in to a transport stream file (TSF), a transmission medium coupled to the transmission device and a set top appliance, coupled to the transmission medium that receives the TSF.

15 Claims, 6 Drawing Sheets

U.S. PATENT DOCUMENTS

| | | | |
|---|---|---|---|
| 5,867,799 A | 2/1999 | Lang et al. | |
| 5,920,700 A | 7/1999 | Gordon et al. | |
| 5,930,493 A | 7/1999 | Ottesen et al. | |
| 5,937,411 A | 8/1999 | Becker | |
| 5,940,738 A | 8/1999 | Rao | |
| 5,945,988 A | 8/1999 | Williams et al. | |
| 5,973,683 A | 10/1999 | Cragun et al. | |
| 5,977,964 A | 11/1999 | Williams et al. | |
| 5,991,841 A | 11/1999 | Gafken et al. | |
| 5,999,526 A | 12/1999 | Garland et al. | |
| 6,002,393 A | 12/1999 | Hite et al. | |
| 6,002,852 A | 12/1999 | Birdwell et al. | |
| 6,005,597 A | 12/1999 | Barrett et al. | |
| 6,006,247 A | 12/1999 | Browning et al. | |
| 6,018,768 A | 1/2000 | Ullman et al. | |
| 6,020,883 A | 2/2000 | Herz et al. | |
| 6,021,433 A | 2/2000 | Payne et al. | |
| 6,055,560 A | 4/2000 | Mills et al. | |
| 6,088,722 A | 7/2000 | Herz et al. | |
| 6,108,645 A | 8/2000 | Eichstaedt et al. | |
| 6,114,376 A | 9/2000 | Prichard et al. | |
| 6,119,189 A | 9/2000 | Gafken et al. | |
| 6,125,259 A | 9/2000 | Perlman | |
| 6,131,127 A | 10/2000 | Gafken et al. | |
| 6,144,376 A | 11/2000 | Connelly | |
| 6,148,005 A | 11/2000 | Paul et al. | |
| 6,160,989 A | 12/2000 | Hendricks et al. | |
| 6,184,918 B1 | 2/2001 | Goldschmidt Iki et al. | |
| 6,240,553 B1* | 5/2001 | Son et al. | 725/95 |
| 6,279,040 B1 | 8/2001 | Ma et al. | |
| 6,289,012 B1 | 9/2001 | Harrington et al. | |
| 6,289,510 B1 | 9/2001 | Nakajima | |
| 6,298,482 B1 | 10/2001 | Seidman et al. | |
| 6,304,578 B1 | 10/2001 | Fluss | |
| 6,317,881 B1 | 11/2001 | Shah-Nazaroff et al. | |
| 6,349,321 B1 | 2/2002 | Katayama | |
| 6,359,557 B2 | 3/2002 | Bilder | |
| 6,359,571 B1 | 3/2002 | Endo et al. | |
| 6,374,405 B1 | 4/2002 | Willard | |
| 6,378,036 B2 | 4/2002 | Lerman et al. | |
| 6,389,593 B1 | 5/2002 | Yamagishi | |
| 6,397,387 B1 | 5/2002 | Rosin et al. | |
| 6,424,625 B1 | 7/2002 | Larsson et al. | |
| 6,434,747 B1 | 8/2002 | Khoo et al. | |
| 6,449,632 B1 | 9/2002 | David et al. | |
| 6,457,010 B1 | 9/2002 | Eldering et al. | |
| 6,460,036 B1 | 10/2002 | Herz | |
| 6,467,089 B1 | 10/2002 | Aust et al. | |
| 6,480,783 B1 | 11/2002 | Myr | |
| 6,490,722 B1 | 12/2002 | Barton et al. | |
| 6,513,069 B1 | 1/2003 | Abato et al. | |
| 6,526,455 B1 | 2/2003 | Kamimura | |
| 6,529,526 B1 | 3/2003 | Schneidewend | |
| 6,557,042 B1 | 4/2003 | He et al. | |
| 6,570,843 B1 | 5/2003 | Wolfgang | |
| 6,571,389 B1 | 5/2003 | Spyker et al. | |
| 6,574,518 B1 | 6/2003 | Lounsberry et al. | |
| 6,578,199 B1 | 6/2003 | Tsou et al. | |
| 6,594,682 B2 | 7/2003 | Peterson et al. | |
| 6,601,237 B1 | 7/2003 | Ten Kate et al. | |
| 6,617,980 B2 | 9/2003 | Endo et al. | |
| 6,678,890 B1 | 1/2004 | Cai | |
| 6,772,209 B1* | 8/2004 | Chernock et al. | 709/225 |
| 6,898,800 B2* | 5/2005 | Son et al. | 725/93 |
| 6,950,604 B1* | 9/2005 | Kato et al. | 386/98 |
| 2001/0012299 A1 | 8/2001 | Dahlen | |
| 2001/0013127 A1 | 8/2001 | Tomita et al. | |
| 2001/0037507 A1 | 11/2001 | Mori | |
| 2002/0047902 A1* | 4/2002 | Thomas et al. | 348/180 |
| 2003/0103532 A1* | 6/2003 | Bertram et al. | 370/528 |

FOREIGN PATENT DOCUMENTS

| | | |
|---|---|---|
| EP | 1 028 551 | 8/2000 |
| EP | 1 043 892 | 10/2000 |
| EP | 1 089 201 | 4/2001 |
| EP | 1 089 571 | 4/2001 |
| EP | 1089571 A | 4/2001 |
| WO | WO 97/26729 | 7/1997 |
| WO | WO 99/44159 | 9/1999 |
| WO | WO 99/65237 | 12/1999 |
| WO | WO 00/01149 | 1/2000 |
| WO | 1043892 A | 10/2000 |
| WO | WO 00/59204 | 10/2000 |
| WO | WO 00/64165 | 10/2000 |
| WO | WO 01/15449 | 3/2001 |
| WO | WO 01/15451 | 3/2001 |
| WO | WO 01/17195 | 3/2001 |
| WO | WO 01/72042 | 9/2001 |
| WO | 01/43862 | 11/2001 |
| WO | WO 01/93524 | 12/2001 |
| WO | 02/17270 | 5/2002 |
| WO | 02/17316 | 5/2002 |
| WO | 02/17381 | 5/2002 |
| WO | WO 02/48863 | 6/2002 |
| WO | 02/29091 | 9/2002 |
| WO | 02/29099 | 9/2002 |
| WO | WO 02/103940 | 12/2002 |
| WO | WO 02/103941 | 12/2002 |
| WO | WO 02/104030 | 12/2002 |
| WO | WO 02/104031 | 12/2002 |
| WO | 03/00169 | 1/2003 |
| WO | WO 03/028381 | 4/2003 |
| WO | WO 03/030540 | 4/2003 |
| WO | WO 03/061245 | 7/2003 |

OTHER PUBLICATIONS

Hu, Qinglong, et al. "Power Conservative Multi-Attribute Queries on Data Broadcast", Data Engineering, 2000. 16th International Conference San Diego, CA. pp. 157-177.

Gummalla, A.C.V., et al., "An Access Protocol for a Wireless Home Network", Wireless Communications and Networking Conference, Sep. 21, 1999, pp. 1392-1396.

Information Technology—Genetic Coding of Moving Picutres and Associated Audio: Systems, Recommendation H.222.0, ISO/IEC 13818-1, Nov. 13, 1994. pp. 1-165.

Hartmut Wittig, et al., "Intelligent Media Agents in Interactive Television Systems", Proceedings of the International Conference on Mutlimedia Computing and Systems, Los Alamitos, CA. May 15, 1995. pp. 182-189, XP000603484.

Stephan Hartwig, et al., "Broadcasting and Processing of Program Guides for Digital TV", SMPTE Journal, SMPTE, Inc., Scarsdale, N.Y., vol. 106, No. 10. Oct. 1997. pp. 727-732, XP000668926.

Program and System Information Protocol for Terrestrial Broadcast and Cable, (Revision A) and Amendment No. 1. Advanced Television Systems Committee. Dec. 23, 1997, 135 pages.

"Digital Video Broadcasing, (DVB) Specification for Service Information (SI) in DVB Systems," ETSI EN 300 468, vol. 1.4.1. (Nov. 2000) European Standard (Telecommunications series), pp. 1-83.

Wieland Holfelder, "Interactive Remote Recording and Playback of Multicast Videoconferences", Sep. 10, 1997; pp. 450-463. XP002088645.

Dr. P. Haubner, et al., "Netzdienste fur Multimediale Anwendungen CSCW—Mbone," Teleseminar Multimedia Systeme-Technologie und Gestaltung WS 95/96, 1996: pp. 1-20, XP002248684. No Translation.

INTEL: Intel Architecture Labs. Internet and Broadcast: The Key To Digital Convergence. Utilizing Digital Technology to Meet Audience Demand. pp. 1-4. Copyright 2000.

INTEL: Intel Architecture Labs. Client Infrastructure for Internet-Based Data Services for Digital Television: Enabling A New Class of DTV Services. Copyright 2000 pp. 1-10.

Enhanced Digital Broadcast, Web Page [online]. IAL Digital Entertainment [retrieved on Aug. 21, 2001] Retrieved from the Internet: <URL: http/ /www.developer.intel.com/ial/home/digentertain/edb.htm. pp. 1-3.

Internet Protocol (IP) Multicast Technology Overview. White paper [online]. Cisco Systems, Inc. Posted Jun. 27, 2001. [retrieved on Jun. 29, 2001] Retrieved from the Internet: <URL: http/ /www.cisco.com/warp/public/cc/pd/iosw/tech/impu_ov.htm pp. 1-16.

"What is Replay TV? Introducing the new ReplayTV 2020". ReplayTV, Web Page [online]. ReplayTV [retrieved on Mar. 21, 2000] Retrieved from the Internet: URL<: http/ /www.replaytv.com/overview/index.htm. p. 1.

"Features. Your Time, Your Schedule", ReplayTV, Web Page [online]. [retrieved on Mar. 21, 2000] Retrieved from the Internet: <URL: http/ /www.replaytv.com/overview/features.htm. pp. 1-2.

Frequently Asked Questions. Will ReplayTV make me more popular? And other frequently asked questions. ReplayTV, Web Page [online]. [retrieved on Mar. 21, 2000] Retrieved from the internet: <URL: http:/ / www.replaytv.com/overview.faqs.htm pp. 1-4.

ReplayTV: Features/Benefits. ReplayTV, Web Page [online]. [retrieved on Mar. 21, 2000] Retrieved from the internet<URL: http:/ /www.replaytv.com/overview/details.htm pp. 1-3.

Competitive Differences. ReplayTV, Web Page. [online] [retrieved on Mar. 21, 2000] Retrieved from the Internet<URL: http:/ /www.replaytv.com/overview/differences.htm. pp. 1-2.

Technical Specifications. ReplayTV, Web Page. [online] [retrieved on Mar. 21, 2000] Retrieved from the internet<URL: http:/ /www.replaytv.com/overview/techspecs.htm. p. 1.

A Better Way to WATCH TV. What is TiVo? Web Page. [online] [retrieved on Mar. 21, 2000] Retrieved from the internet<URL:http:/ /www.tivo.com/what/intro.html. p. 1.

Control LIVE TV. What is TiVo? Web Page. [online] [retrieved on Mar. 21, 2000] Retrieved from the internet<URL: http:/ /www.tivo.com/what/intro2.html. p. 1.

Something GOOD is Always On. What is TiVo? Web Page. [online] [retrieved on Mar. 21, 2000] Retrieved from the internet<URL: http:/ /www.tivo.com/what/intro3.html. p. 1.

Channel SURF in a Whole New Way. What is TiVo? Web Page. [online] [retrieved on Mar. 21, 2000] Retrieved from the internet<URL: http:/ /www.tivo.com/what/intro4.html. p. 1.

DIGITAL Recordings without the Tape. What is TiVo? Web Page. [online] [retrieved on Mar. 21, 2000.] Retrieved from the internet<URL: http:/ /www.tivo.com/what/intro5.html. p. 1.

What you want, When you Want it.™ What is TiVo? Web Page. [online] [retrieved on Mar. 21, 2000] Retrieved from the internet<URL: http:/ /www.tivo.com/what/how.html. p. 1.

PRODUCT Specifications. What is TiVo? Web Page. [online] [retrieved on Mar. 21, 2000] Retrieved from the internet<URL: http:/ /www.tivo.com/what/how2.html. p. 1.

Frequently asked Questions. What is TIVo? Web Page. [online] [retrieved on Mar. 21, 2000] Retrieved from the internet<URL: http:/ /www.tivo.com/what/faq_sub.html. pp. 1-9.

Digital Video Broadcasting (DVB); Specifications for Service Information (SI) in DVB systems. European Broadcasting Union. ETSI EN 300 468 V1.4.1 (Nov. 2000) pp. 1-83. France. Copyright 2000.

Program And System Information Protocol for Terrestrial Broadcast And Cable (Revision A) And Amendment No. 1. *Advanced Television Systems Committee*. Dec. 23, 1997. Rev. A—May 31, 2000. pp. a-e And pp. 1-135. Copyright 2000.

Smyth, B. et al. A Personalized Television Listings Service; Communications of the ACM. Aug. 2000, vol. 43, No. 8, pp. 107-111.

Haskell, Barry G. et al., Digital Video: An Introduction to MPEG-2; 1997; Chapman & Hall; New York, NY. pp. 280-283.

*Intelligent Media Agents in Interactive Television Systems*, Hartmug Wittig, et al., Proceedings of the International Conference on Multimedia Computing and Systems, Los Alamitos, CA, US, May 15, 1995, pp. 182-189, XP000603484.

*Broadcasting and Processing of Program Guides for Digital TV*, SMPTE Journal, Stephan Hartwig, et al., SMPTE Inc., Scarsdale, N.Y., US, vol. 106, No. 10, Oct. 1997, pp. 727-732, XP000668926.

*Program and System Information Protocol for Terrestrial Broadcast and Cable (Revised A) and Amendment No. 1*, Advanced Television Systems Committee, Dec. 23, 1997, 135 pgs.

*Digital Video Broadcasting (DVB); Specification for Service Information (SI) in DBV Systems*, ETSI EN 300 468, vol. 1.4.1 (Nov. 2000), European Standard (Telecommunication Series), 83 pgs.

U.S. Appl. No. 09/533,024, filed Mar. 22, 2000, Jay Connelly.

U.S. Appl. No. 09/832,421, filed Mar. 29, 2001, Jay Connelly.

U.S. Appl. No. 09/967,829, filed Sep. 28, 2001, Curtis Jutzi, et al.

"Information Technology-Generic Coding of Moving Pcitures and Associated Audio: Systems", Nov. 13, 1994.

PCT International Search Report, PCT/US02/29091, Mar. 4, 2993.

* cited by examiner

METHOD FOR DELIVERING TRANSPORT STREAM DATA

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to set top appliances; more particularly, the present invention relates to delivering MPEG-2 transport streams.

BACKGROUND

Along with the increasing interest in the Internet and the World Wide Web, appliances or set-top boxes similar to cable television boxes have been developed in an attempt to allow access to satellite transmissions and the Internet through the traditional television set. However, such attempts suffer from delays in accessing content. For instance, restricted bandwidth may cause transmission errors during the transmission of pure audio and video bit streams to a set top appliance. These transmission errors are received at the set top appliance as a component of the bit stream data. As a result, the errors appear as signal degradation during the playback of the data at the set top appliance.

BRIEF DESCRIPTION OF THE DRAWINGS

The present invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Figure 1:
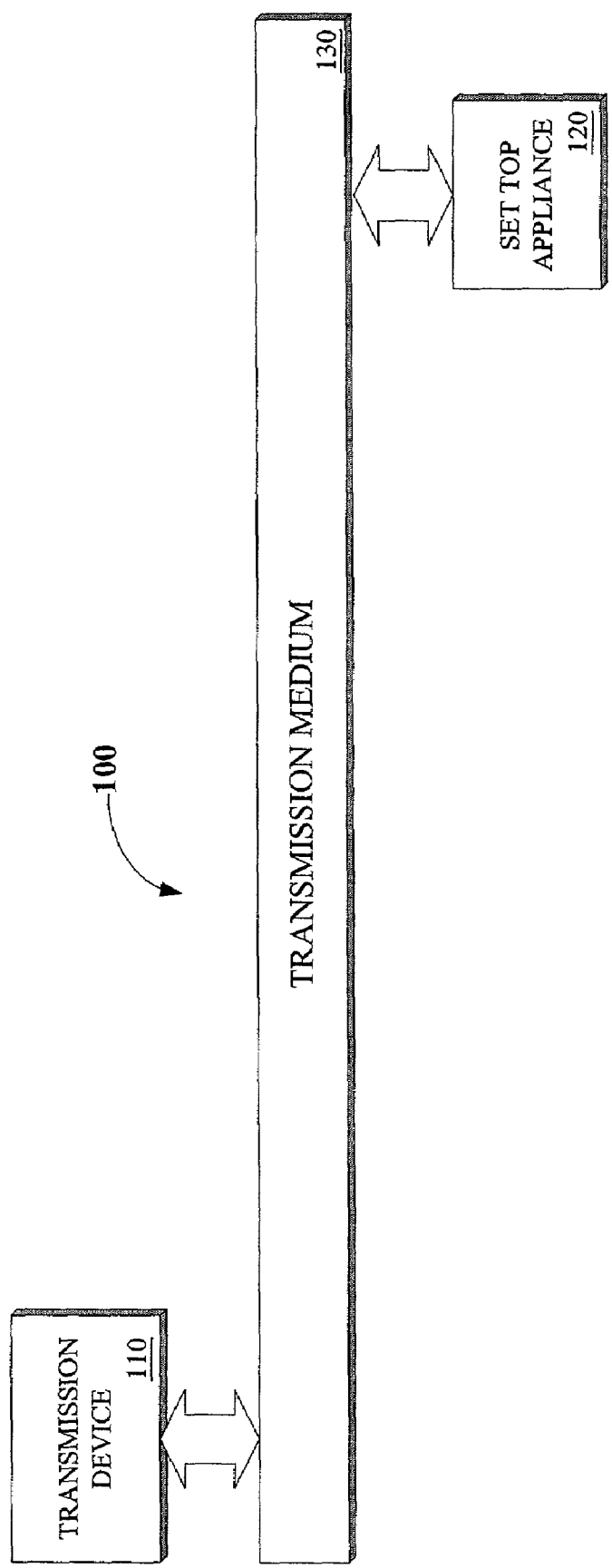
FIG. 1 illustrates one embodiment of a data delivery system.

A method for delivering transport stream data to a set top appliance is described. According to one embodiment, audio and video bit streams are encoded at a transmission device and combined to form a single transport stream. The transport stream is converted into a file format and stored. Subsequently, the file is encoded for transport, modulated and transmitted to a set top appliance for access by a set top appliance user.

In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 illustrates one embodiment of a data delivery system 100. System 100 includes a transmission device 110 and a set top appliance 120 coupled via a transmission medium 130. In one embodiment, transmission device 110 operates as a source device that sends data objects to set top appliance 120, operating as a receiving device. The objects may be, for example, a transport stream, a data file, an executable, or other digital objects. The objects are sent via data transmission medium 130. The data transmission medium 130 may be one of many mediums.

According to one embodiment, transmission medium 130 is a satellite transmission. However, in other embodiments, transmission medium 130 may be a terrestrial broadcast, an internal network connection, an Internet connection, or other connections. According to one embodiment, set-top appliance 120 is implemented for digital satellite services in order to receive content from transmission device 110. However, in other embodiments, set top appliance 120 may be a personal computer (PC) coupled to transmission device 110, wherein the transmission medium is the Internet.

Figure 2:
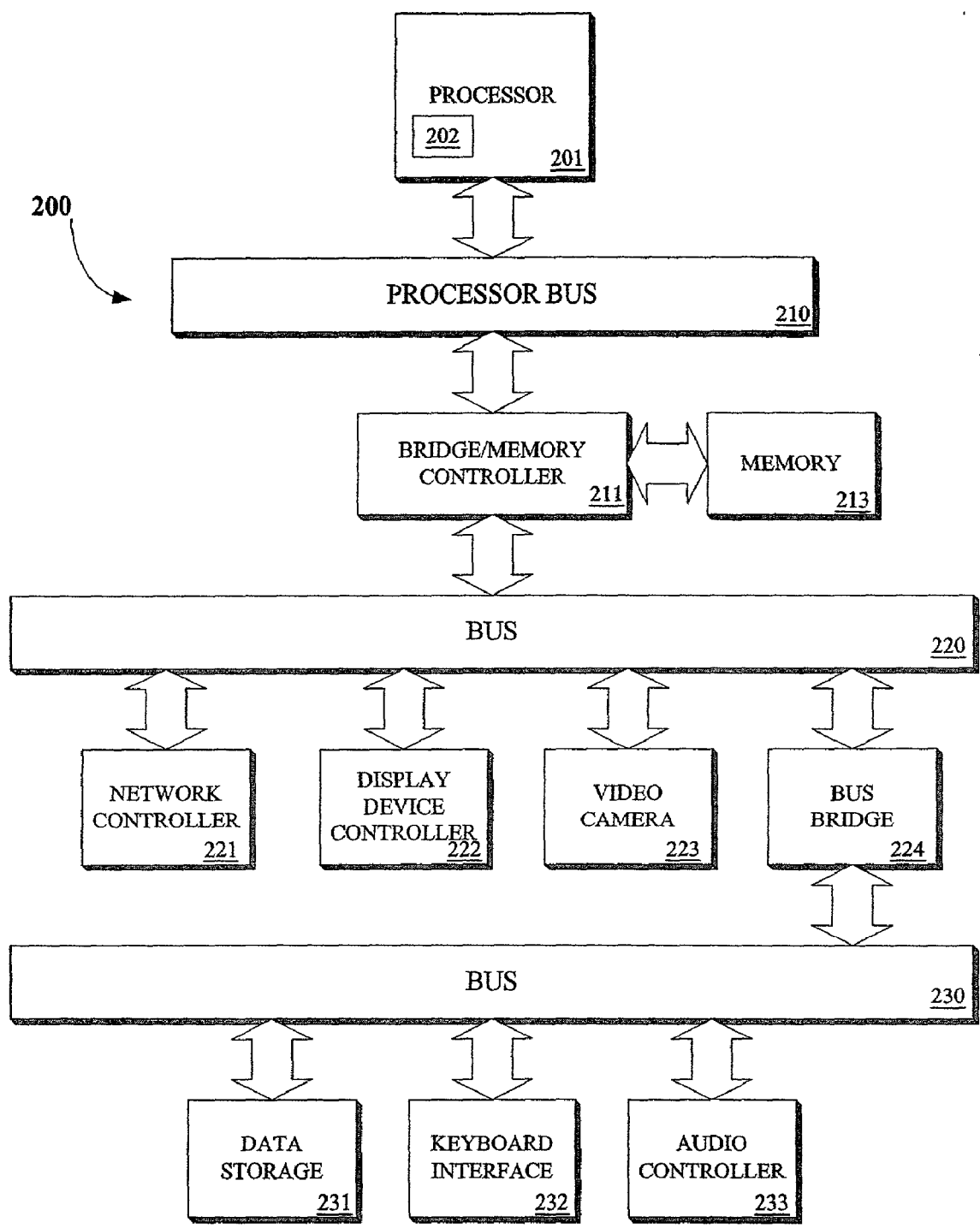
FIG. 2 is a block diagram of one embodiment of a computer system.

FIG. 2 is a block diagram of one embodiment of a computer system 200. Computer system 200 may be implemented as transmission device 110 or set top appliance 120 (both shown in FIG. 1). The computer system 200 includes a processor 201 that processes data signals. Processor 201 may be a complex instruction set computer (CISC) microprocessor, a reduced instruction set computing (RISC) microprocessor, a very long instruction word (VLIW) microprocessor, a processor implementing a combination of instruction sets, or other processor device.

In one embodiment, processor 201 is a processor in the Pentium® family of processors including the Pentium® II family and mobile Pentium® and Pentium® II processors available from Intel Corporation of Santa Clara, Calif. Alternatively, other processors may be used. FIG. 2 shows an example of a computer system 200 employing a single processor computer. However, one of ordinary skill in the art will appreciate that computer system 200 may be implemented using multiple processors.

Processor 201 is coupled to a processor bus 210. Processor bus 210 transmits data signals between processor 201 and other components in computer system 200. Computer system 200 also includes a memory 213. In one embodiment, memory 213 is a dynamic random access memory (DRAM) device. However, in other embodiments, memory 213 may be a static random access memory (SRAM) device, or other memory device. Memory 213 may store instructions and code represented by data signals that may be executed by processor 201.

According to one embodiment, a cache memory 202 resides within processor 201 and stores data signals that are also stored in memory 213. Cache 202 speeds up memory accesses by processor 201 by taking advantage of its locality of access. In another embodiment, cache 202 resides external to processor 201.

Computer system 200 further includes a bridge memory controller 211 coupled to processor bus 210 and memory 213. Bridge/memory controller 211 directs data signals between processor 201, memory 213, and other components in computer system 200 and bridges the data signals between processor bus 210, memory 213, and a first input/output (I/O) bus 220. In one embodiment, I/O bus 220 may be a single bus or a combination of multiple buses.

In a further embodiment, I/O bus 220 is a Peripheral Component Interconnect adhering to a Specification Revision 2.1 bus developed by the PCI Special Interest Group of Portland, Ore. In another embodiment, I/O bus 220 may be a Personal Computer Memory Card International Association (PCMCIA) bus developed by the PCMCIA of San Jose, Calif. Alternatively, other busses may be used to implement I/O bus. I/O bus 220 provides communication links between components in computer system 200.

A network controller 221 is coupled I/O bus 220. Network controller 221 links computer system 200 to a network of computers (not shown in FIG. 2) and supports communication among the machines. A display device controller 222 is also coupled to I/O bus 220. Display device controller 222 allows coupling of a display device to computer system 200, and acts as an interface between the display device and computer system 200. In one embodiment, display device controller 222 is a monochrome display adapter (MDA) card. In other embodiments, display device controller 222 may be a color graphics adapter (CGA) card, an enhanced graphics adapter (EGA) card, an extended graphics array (XGA) card or other display device controller.

The display device may be a television set, a computer monitor, a flat panel display or other display device. The display device receives data signals from processor 201 through display device controller 222 and displays the information and data signals to the user of computer system 200. A video camera 223 is also coupled to I/O bus 220.

Computer system 200 includes a second I/O bus 230 coupled to I/O bus 220 via a bus bridge 224. Bus bridge 224 operates to buffer and bridge data signals between I/O bus 220 and I/O bus 230. I/O bus 230 may be a single bus or a combination of multiple buses. In one embodiment, I/O bus 230 is an Industry Standard Architecture (ISA) Specification Revision 1.0a bus developed by International Business Machines of Armonk, N.Y. However, other bus standards may also be used, for example Extended Industry Standard Architecture (EISA) Specification Revision 3.12 developed by Compaq Computer, et al.

I/O bus 230 provides communication links between components in computer system 200. A data storage device 231 is coupled to I/O bus 230. I/O device 231 may be a hard disk drive, a floppy disk drive, a CD-ROM device, a flash memory device or other mass storage device. A keyboard interface 232 is also coupled to I/O bus 230. Keyboard interface 232 may be a keyboard controller or other keyboard interface. In addition, keyboard interface 232 may be a dedicated device or can reside in another device such as a bus controller or other controller. Keyboard interface 232 allows coupling of a keyboard to computer system 200 and transmits data signals from the keyboard to computer system 200. An audio controller is also coupled to I/O bus 230. Audio controller 233 operates to coordinate the recording and playing of sounds.

As described above, transmission device 110 transmits streaming data to set top appliance 120. According to one embodiment, Moving Picture Experts Group 2 (MPEG2) transport streams are transmitted from transmission device 110 to set top appliance 120. The transport streams are used to combine programs made up of packetized elementary streams (PES) coded data with one or more independent time bases into a single stream. Typically, in the MGEG-2 standard, an individual program does not have to have a unique time base, but if it does, the time base is the same for all of the elements of the individual program.

Figure 3:
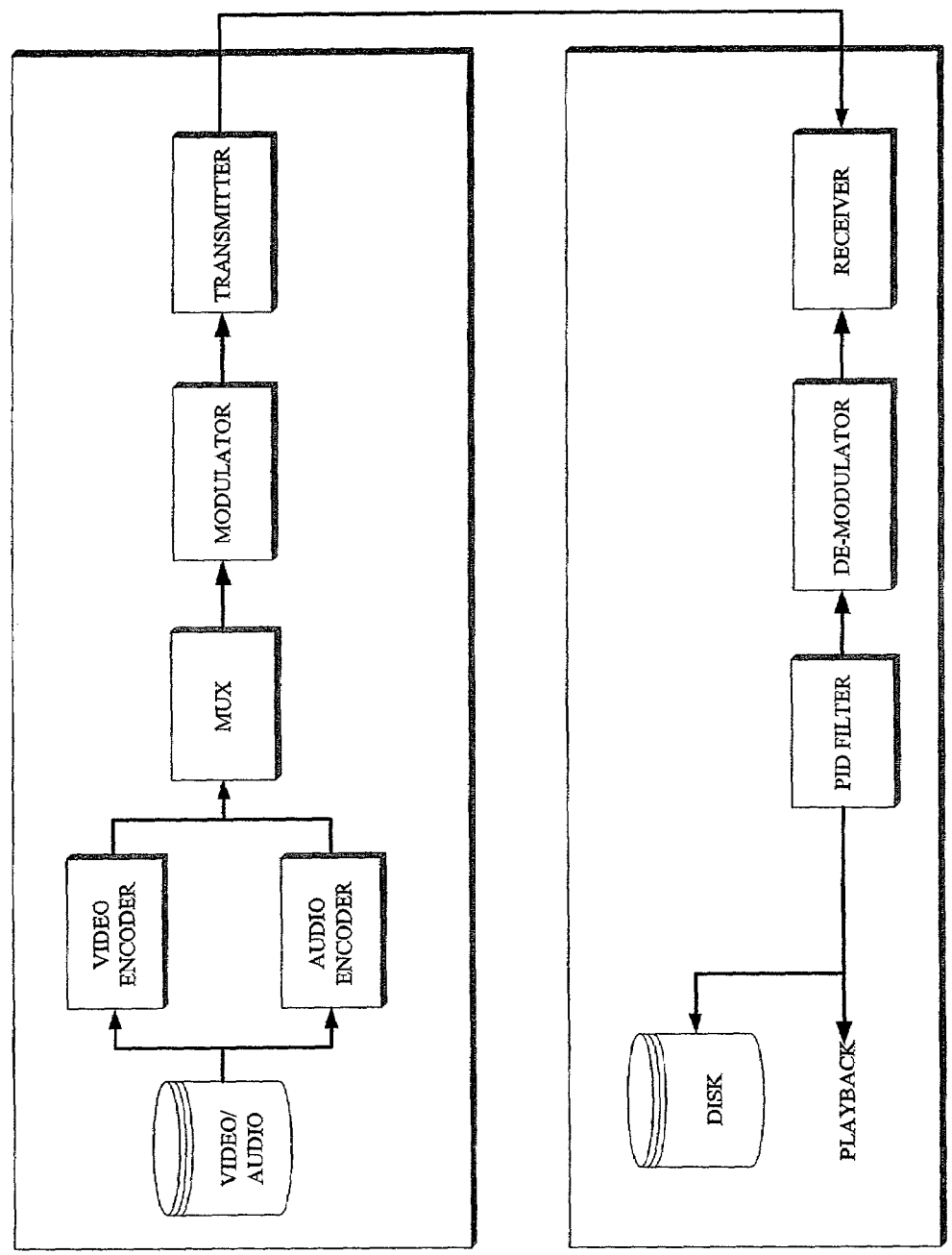
FIG. 3 illustrates an exemplary transmission device and set top appliance.

FIG. 3 illustrates an exemplary system implemented to deliver streaming data to a set top appliance. Typically, pure audio and video bit streams are received at the transmission device where they are separately encoded using MPEG-2 encoding techniques. Subsequently, the audio and video bit streams are combined at a multiplexer to form a single bit stream. After, the single bit stream is formed, it is modulated and transmitted from the transmission device to the set top appliance.

The set top appliance receives the bit stream data and demodulates the data. Subsequently the data is filtered. After filtering, the data can be played at an attached display and/or audio device as it is received. Alternatively, the data may be stored at the appliance for later playback. The procedure for transporting the compressed bit stream from the transmission device to the set-top appliance, and for thereafter decompressing the bit stream at the set-top appliance, so that one of the many picture sequences is decompressed and may be displayed in real-time is specified in the Industry Standard Organization (ISO) 13818-1 Standard. ISO 13818-1 is the systems or transport layer portion of the MPEG-2 standard. One of ordinary skill in the art will appreciate that other MPEG standard streams (e.g., MPEG-1, Layer 3 (MP3), MPEG-4, etc.) may be implemented.

The problem with the conventional system described in FIG. 3 is that regardless of whether the set-top appliance plays the received data back live, or records the data to disk, there is a significant potential for errors. Since the bit stream data is transmitted live from the transmission device to the set top appliance, dedicated full-time bandwidth is required. If there is not sufficient bandwidth to handle the "live" bit stream data, packets may be dropped, resulting in signal degradation when the set top appliance plays the data. The signal degradation appears regardless of whether the data is immediately played upon receipt at the set top appliance or stored to disk for later playback since the signal errors are stored as well.

The term "live" is defined as streaming data that is transmitted from the transmission device to the set top appliance. For example, the data being streamed to the set top appliance may be from an occurring event, or from a pre-recorder event, delivered to the transmission device. Nevertheless, the data is considered live since the set top appliance is incapable of distinguishing the difference between data from a live event and pre-recorded data that has been received.

Figure 4:
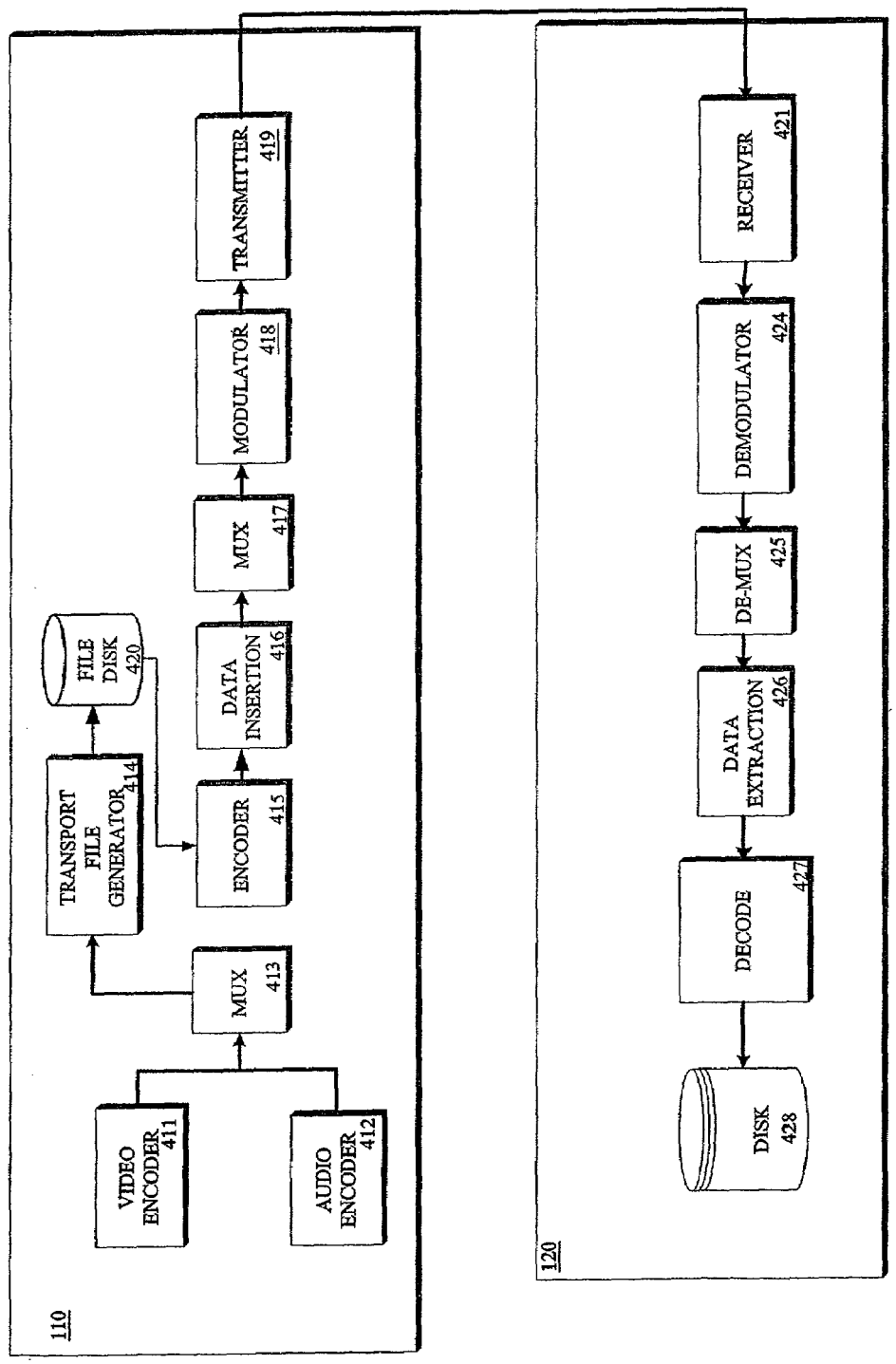
FIG. 4 is a block diagram of one embodiment of a transmission device and a set top appliance.

According to one embodiment, a transport stream file (TSF) is generated and stored at a transmission system and delivered to a set top appliance as a file. A TSF is a data file that contains the bit stream data that is received at a set top appliance via a reliable delivery mechanism without errors attributed to transmission. Moreover, dedicated bandwidth is not necessary for delivery of the TSF to a set top appliance. FIG. 4 is a block diagram of one embodiment of a transmission device 110 and a set top appliance 120.

Referring to FIG. 4, transmission device 110 includes a video encoder 411, an audio encoder 412 a multiplexer (MUX) 413, a transport file generator 414, a file transport encode module 415 and file disk 420. In addition, transmission device 110 includes a data insertion module 416, a MUX 417, a modulator 418 and a transmitter 419.

Video encoder 411 and audio encoder 412 form video and audio elementary streams of received data, respectively. Encoders 411 and 412 packetize the elementary streams into PES coded data. MUX 413 multiplexes the PES of audio data, video data, and other systems data into a system stream. Transport file generator 414 receives the combined stream of packetized data and converts the stream into a file format.

Encode module 415 provides encoding of the TSF for transport. In one embodiment, encode module 425 uses Forward Error Correction (FEC) and carousel ling to encode the data. FEC provides for the mitigation of errors arising during the transmission of data over transmission medium 310. With a data carousel, encode module 415 partitions the TSF into equal length packet symbols. Thus, the FEC codes are used in a data carousel fashion in order to provide reliability by cycling through and transmitting the encoding symbols instead of the source signals.

File disk 420 is implemented to store the TSF after it is generated. In one embodiment, file disk 420 is implemented using data storage 231 (FIG. 2). Data insertion module 416 encapsulates the encoded packet stream IP data into Multi Protocol Encapsulation (MPE) packets implemented by MPEG-2. MUX 417 is an MPEG-2 multiplexer that combines multiple input transport streams into a single output transport stream that is to be transmitted. Modulator 418 merges the packet data stream into a carrier for transmission. Transmitter 419 transmits the file data via transmission medium 130. As described above, transmission may be implemented as a satellite transmission. Thus, transmitter 419 transmits the signals to uplink for satellite.

Figure 5:
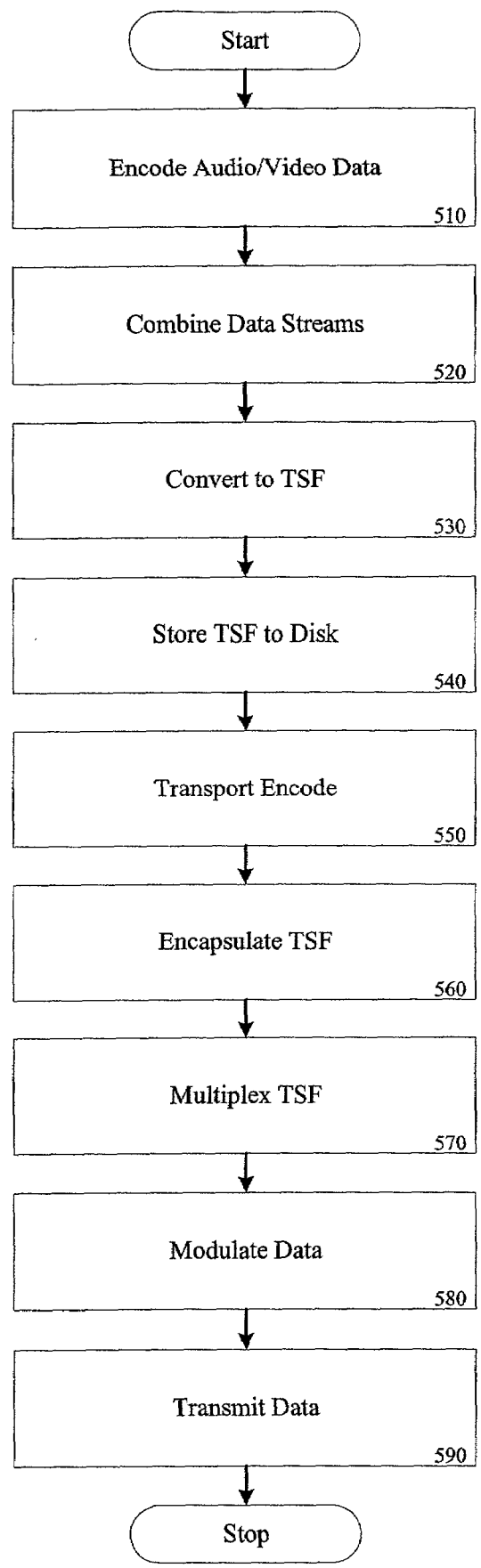
FIG. 5 is a flow diagram for one embodiment of the operation of a transmission device.

FIG. 5 is a flow diagram for one embodiment of the operation of transmission device 110. At processing block 510, audio and video bit streams are encoded at encoder 412 and encoder 411, respectively. At processing block 520, the audio and video bit streams are combined at multiplexer 413 to form a transport stream. At processing block 530, the transport stream is converted into a TSF format.

At processing block 540, the TSF file is stored at file disk 415. At processing block 550, the TSF is encoded for file transport at encoder 415. At processing block 560, the data is encapsulated at data insertion 416 into PES coded data. At processing block 570, the data is multiplexed at MUX 417 to form a transport stream. At processing block 580, the data is modulated at modulator 550. At processing block 590, the data is transmitted from device 110.

Referring back to FIG. 4, set top 120 includes a receiver 421, demodulator 424, de-multiplexer (DE-MUX) 425, data extraction module 426 a decode module 427 an disk 428. Receiver 421 receives the TSF from transmission medium 130. De-modulator 424 extracts the packet data stream from the carrier. DE-MUX 425 separates the received transport stream into one or more output transport streams. Data extraction module 416 extracts the packet stream of data. Decode module decodes the FEC coded packets. Disk 428 is implemented to store the TSF at set top appliance 120.

Figure 6:
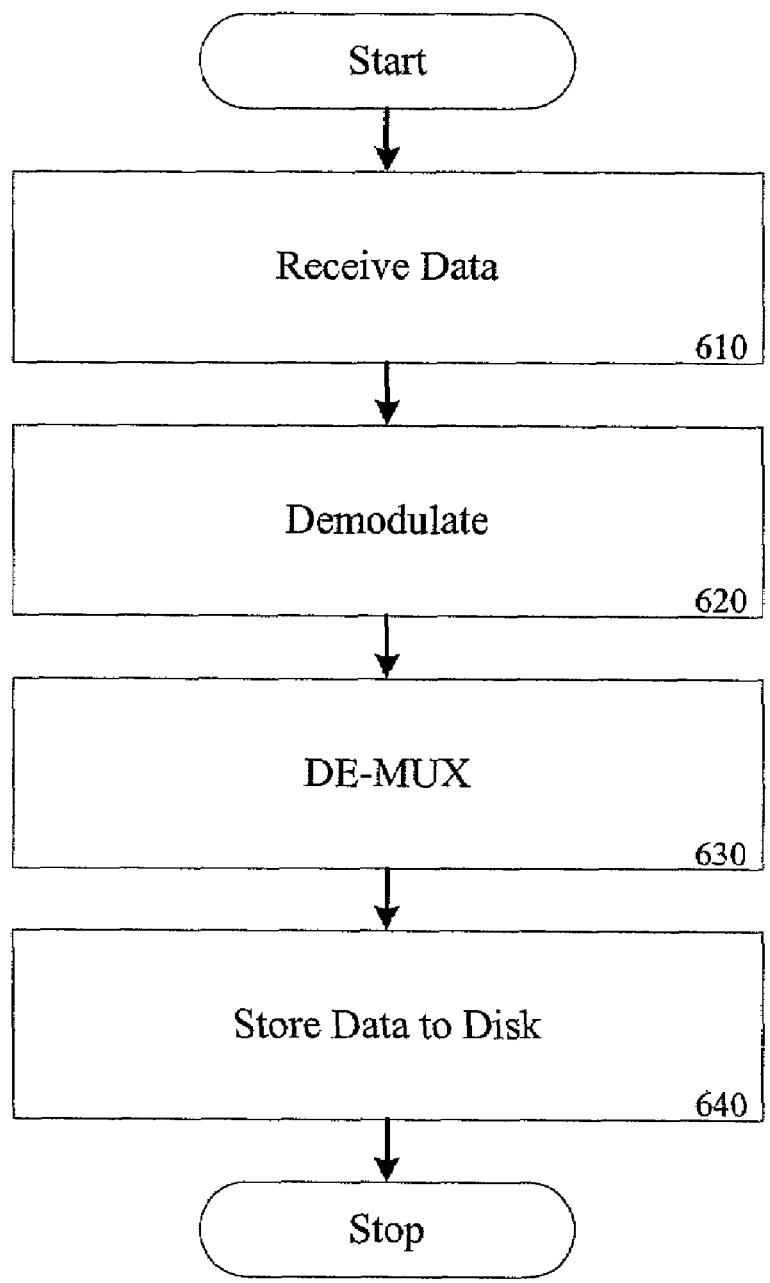
FIG. 6 is a flow diagram for one embodiment of the operation of a set top appliance.

FIG. 6 is a flow diagram for one embodiment of the operation of set top appliance 120. At processing block 610, the TSF data is received at set top appliance 120. At processing block 620, the data is de-modulated. At processing block 630, the data is de-multiplexed and decoded. At processing block 640, the TSF is stored to the set top appliance 120 hard disk.

The above-described method of delivering a transport stream in a one-way broadcast helps to ensure that content is delivered in an error free format. This type of delivery is significant in providing a customer with a great experience in watching/listening to content.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as the invention.

What is claimed is:

1. A system comprising:
a transmission device having:
   a transport stream file (TSF) generator to convert a transport stream of audio/video data in to a TSF including the audio/video data;
   a file disk to store the TSF after it is generated by the TSF generator; and
   an encode module to apply Forward Error Correction to the TSF to identify errors arising during transmission of the TSF and to encode the TSF for the transmission;
a transmission medium coupled to the transmission device to transmit the TSF; and
a set top appliance, coupled to the transmission medium, to receive the TSF.

2. The system of claim 1 wherein the transmission device further comprises:
a video encoder to encode video bit streams received at the transmission device;
an audio encoder to encode that encodes audio bit streams received at the transmission device; and
a first multiplexer, coupled to the audio encoder and the video encoder, to combine the encoded audio and video bit streams to form a transport stream to transmit to the TSP generator for conversion.

3. The system of claim 2 wherein the transmission device further comprises:
a data insertion module coupled to the encode module;
second multiplexer coupled to the data insertion module;
a modulator coupled to the second multiplexer; and
a transmitter coupled to the modulator.

4. The system of claim 3 wherein the encode module uses carouseling to encode the TSF.

5. The system of claim 3 wherein the set top appliance comprises:
a receiver;
a demodulator coupled to the receiver;
a de-multiplexer, coupled to the demodulator;
a data extraction module coupled to the de-multiplexer;
a decode module coupled to the data extraction module; and
data storage coupled to the decode module.

6. The system of claim 1 wherein the transmission medium is a satellite transmission.

7. The system of claim 1 wherein the transmission medium is a terrestrial broadcast.

8. The system of claim 1 wherein the transmission medium is the Internet.

9. A transmission device comprising:
a video encoder to encode video bit streams received at the transmission device;
an audio encoder to encode audio bit streams received at the transmission device;
a first multiplexer, coupled to the audio encoder and the video encoder, to combine the encoded audio and video bit streams to form a transport stream; and
a transport stream file (TSF) generator, coupled to the first multiplexer, to convert the transport stream into a TSF including the audio/video data transport stream;
a file disk to store the TSF after it is generated by the TSF generator; and
an encode module to apply Forward Error Correction to the TSF to identify errors arising during transmission of the TSF and to encode the TSF for the transmission.

10. The transmission device of claim 9 further comprising:
a data insertion module coupled to the encode module;
a second multiplexer coupled to the data insertion module;
a modulator coupled to the second multiplexer; and
a transmitter coupled to the modulator.

11. A method comprising:
encoding audio and video bit streams at a transmission device;
combining the audio and video bit streams to form a transport stream;
converting the transport stream to a transport stream file (TSF) including the audio/video data transport stream;
storing the TSF after it is converted from the transport stream; and
applying Forward Error Correction to the TSF to identify errors arising during a transmission of the TSF.

12. The method of claim 11 further comprising:
encoding the TSF for transport;
multiplexing the TSF;
modulating the TSF; and
transmitting the TSF.

13. The method of claim 12 further comprising:
receiving the TSF at a set top appliance;
demodulating the TSF;
decoding the TSF; and
storing the TSF.

14. An article of manufacture including one or more computer readable media that embody a program of instructions wherein the program of instructions, when executed by a processing unit, causes the processing unit to:
encode audio and video bit streams at a transmission device;
combine the audio and video bit streams to form a transport stream; and
convert the transport stream to a transport stream file (TSF) including the audio/video data transport stream;
store the TSF after it is converted from the transport stream; and
apply Forward Error Correction to the TSF to identify errors arising during a transmission of the TSF.

15. The article of manufacture of claim 14 wherein the program of instructions, when executed by a processing unit, further causes the processing unit to
encode the TSF for transport;
multiplex the TSF;
modulate the TSF; and
transmit the TSF.

* * * * *